May 7, 1946.
T. NORCROSS
2,399,937
TIRE REPAIRING APPARATUS
Filed Feb. 19, 1944
3 Sheets-Sheet 1
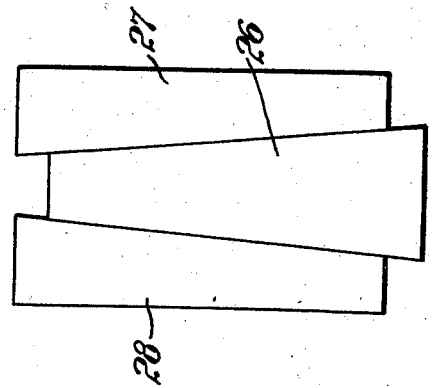
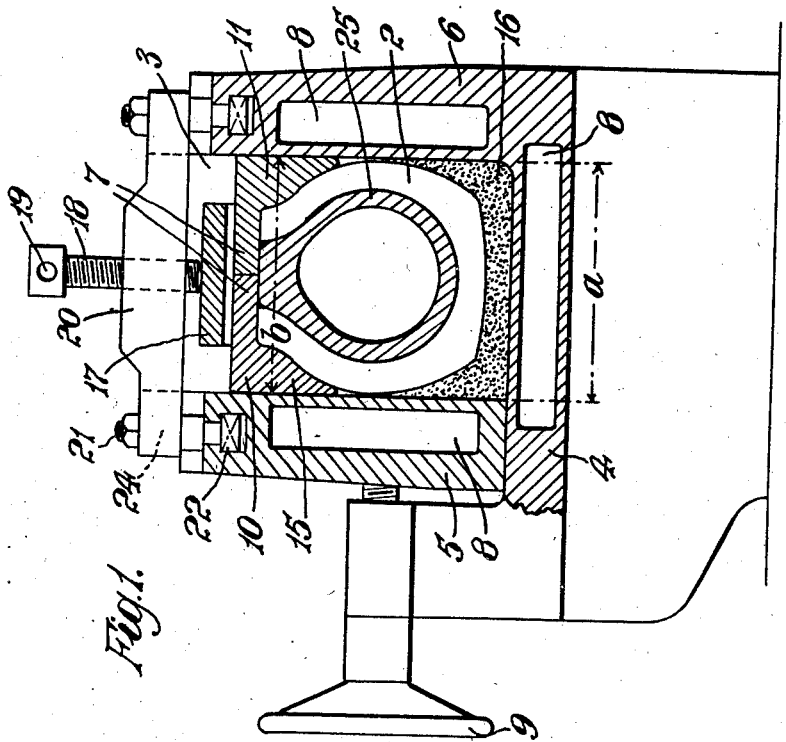
Inventor
Thomas Norcross
By Benj. T. Rauber Attorney

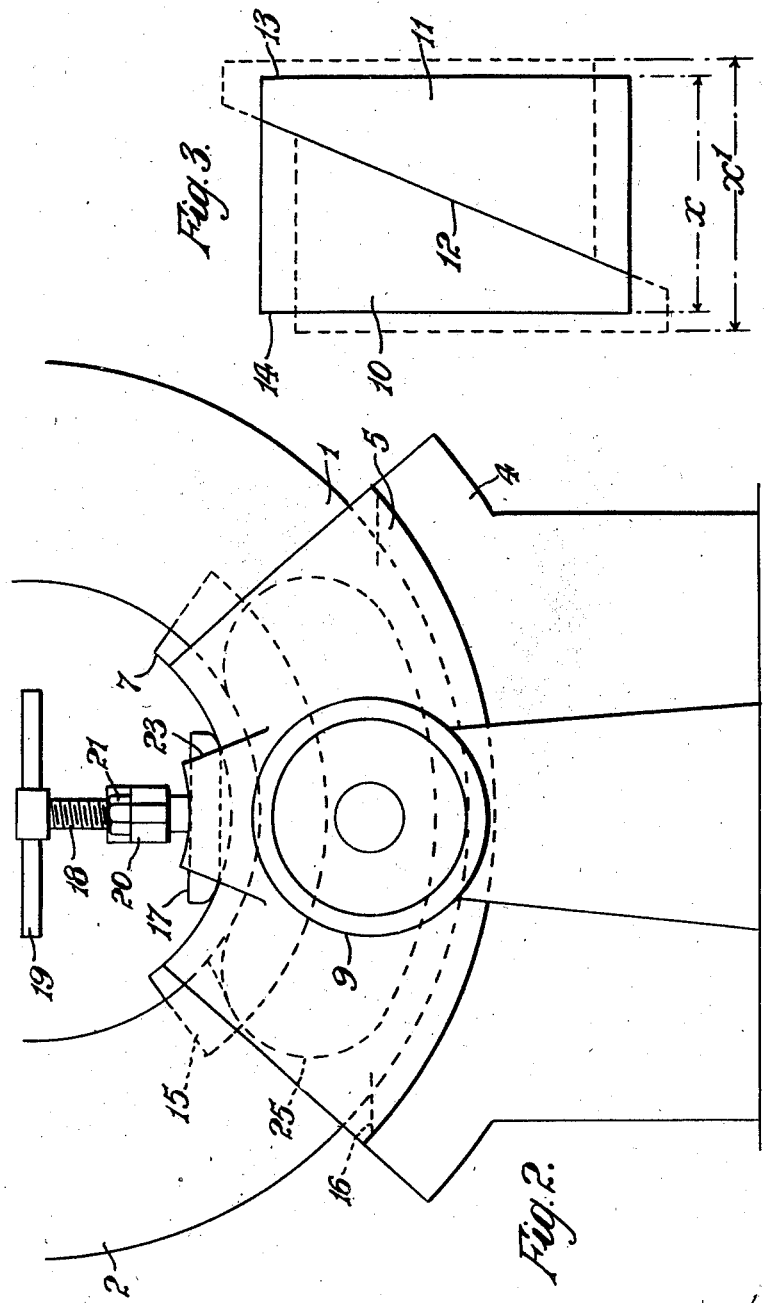

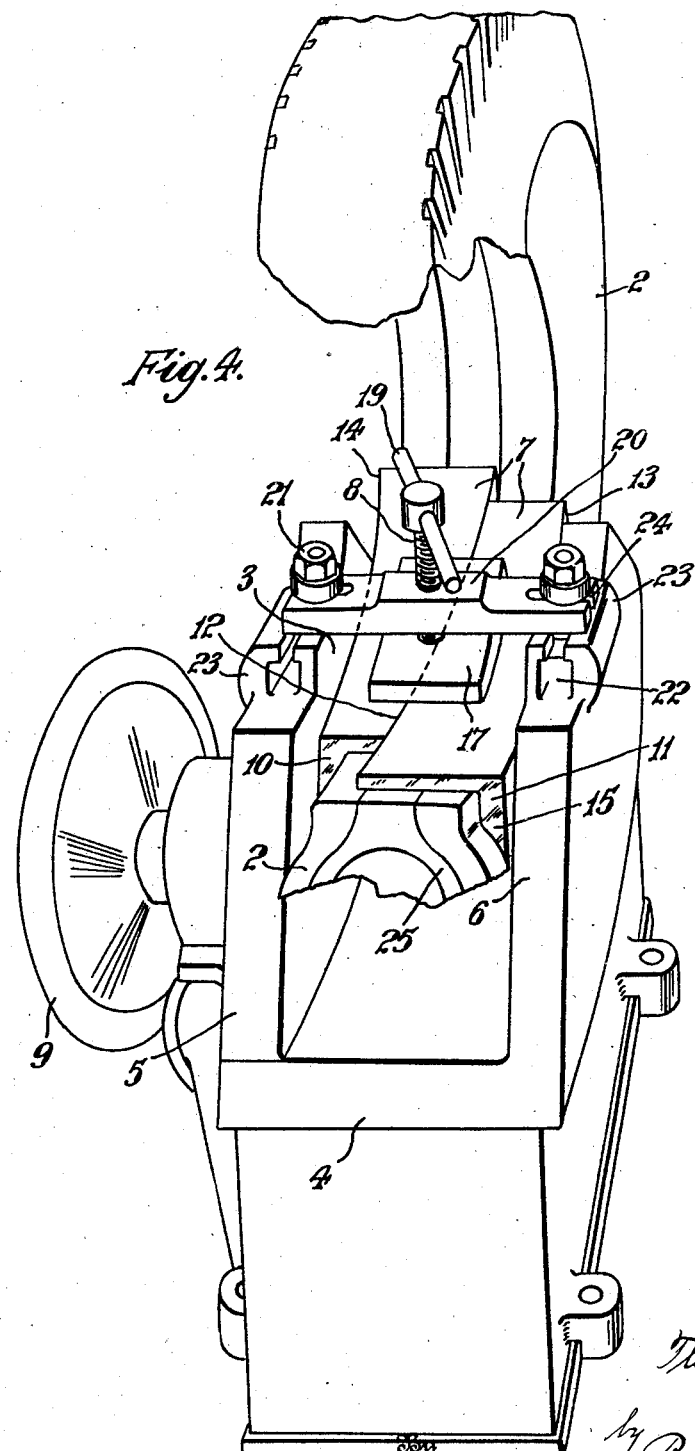

Patented May 7, 1946

2,399,937

UNITED STATES PATENT OFFICE 2,399,937

TIRE REPAIRING APPARATUS

Thomas Norcross, Erdington, Birmingham, England, assignor to Dunlop Rubber Company Limited, London, England, a British company Application February 19, 1944, Serial No. 523,144
In Great Britain February 23, 1943

8 Claims. (Cl. 18—18)

My invention relates to tire repairing apparatus and its object is to provide apparatus which is adaptable to different sizes of tire more readily than hitherto.

The invention relates specifically to the part-circle kind of such apparatus wherein a segment of the tire is treated in a cavity formed by a tread member, two side-wall members and a bead member, and wherein provision is made to accommodate tires of different cross-section by varying (a) the effective spacing between the side-wall members and (b) the effective width of the bead members to suit.

Variation (a) is sometimes done by using packing pieces between fixed side-wall members and sometimes by having the side-wall members relatively movable; and variation (b) is sometimes done by splitting the bead member longitudinally and using packing pieces between the two sections so formed, and sometimes by having a bead member for every sectional size of tire.

According to the present invention I provide tire repairing apparatus of the kind specified wherein the bead member is in two or more sections of which the lateral spacing is variable with the aid of inclined plane means, said sections being for example of generally wedge-shaped or taper form as seen in plan.

In the term "inclined plane" I include modifications such as the form which comprises the inclined plane developed into a helix. In fact, the sections of my bead member preferably have helical taper faces on which they meet and slide after the fashion of a screw, the screw being an accepted development of the inclined plane.

In order that the said invention may be easily understood and readily carried into effect, the same will now be described with reference to the accompanying drawings in which—

Figure 1 is a diagram in cross section illustrating one form of apparatus according to the invention;

Figure 2 is a side view thereof;

Figure 3 is a diagrammatic plan view of the bead member;

Figure 4 is a perspective view with a tire indicated in position; and

Figure 5 is a diagrammatic plan view of an alternative form of bead member.

Referring to Figures 1 and 2, these illustrate a part-circle tire repairing apparatus wherein a segment 1 of the tire 2 is treated in a cavity 3 formed by a tread member 4, two side-wall members 5 and 6 and a bead member 7, provision being made to accommodate tires of different cross section by varying (a) the effective spacing between said side-wall members and (b) the effective width of the bead members to suit.

The tread member and the side wall members are chambered as shown at 8 to take steam and they will hereinafter be called chests.

As shown the tread chest 4 and the side chest 6 are integral. The side chest 5 slides to and from the side chest 6 by screw mechanism operated by handwheel 9. This comprises the aforesaid provision for varying the spacing (a) Figure 1.

The width-adjustable bead member of my invention consists, as illustrated in Figures 1 to 4 of the drawings, of a pair of wedge-shaped sections 10 and 11, each of single-taper form, which together fit between the side chests as shown in Figure 1.

As shown in full lines Figure 3, in one position in plan the figure formed by said sections is a rectangle divided obliquely by the junction 12 between the two said sections. Relative sliding movement between said sections on said oblique division alters the distance between the parallel edges 13 and 14 of said figure, which then becomes not a rectangle but a polygon made up of two contacting trapezia as shown in dotted lines in Figure 3. If the two sections are disposed as shown in full lines the bead member has an effective width of $x$: if said sections are disposed as shown in dotted lines the effective width is then $x'$.

The bead members may have contoured parts 15 adapted to fit against the sides of the tire beads and the tire walls thereadjacent, and these contoured parts may be separate from said bead members or as shown formed integrally therewith. To provide a suitable matrix for the tire tread, molten metal 16 may be poured into place around it: or I may use pre-formed pieces.

Bearing against the top surface of the bead member there is a pressure plate 17 backed by a screw 18 displaceable by a tommy bar 19 in a bridge structure 20 which spans the side chests. Said pressure plate may be shaped as shown in Figure 2 to contact the bead member across an arc thereof so that one plate is suitable for various diameters of bead member.

The bridge 20 complete with its screw 18 is removable to allow the tire to be positioned in the apparatus and removed therefrom. As shown it is anchored to the side chests by bolts 21 having T heads which fit in slots 22 in lugs 23 integral with the side chests 5 and 6. To accommodate differences in spacing a Figure 1, bolts 21 engage bridge 20 via slots 24.

Moulding pressure is provided by an inflatable chamber 25 disposed within the tire section: said chamber has a cross-section which fits the interior of the tire as shown in Figure 1, while circumferentially it has a length substantially as shown in dotted line in Figure 2.

It will be observed that the sections 10 and 11 meet, and slide for adjustment, on their taper faces, with their non-taper faces fitting flat against the inner faces of the chests. The bead member provides, adjacent the pressure plate 17, a continuous transverse surface between the chests; in other words there are no gaps. As shown in Figure 2 said member as seen in side view follows the circle of the tire and the junction between its sections is not perfectly straight as indicated at 12 in Figure 3, but is helical so that the sections slide on each other with a screw motion; in this way the taper faces maintain complete contact at all positions of adjustment, which they wouldn't do if the line of their junction was straight.

In operation, the apparatus being open, the patched tire is positioned—having the inflatable chamber 25 already in place within it, and the sliding side chest 5 is advanced until it contacts the side of the tire. The two sections 10 and 11 of the bead member are then placed between the side chests and slid relatively until their longitudinal edges contact said chests. The pressure plate 17 is then fitted over said sections and, after the bridge 20 has been positioned, the screw 18 is advanced against said plate by the tommy bar 19. The chamber 25 is then inflated and, steam having been admitted into the chests, the repair is left to vulcanise as required.

I do not confine myself to the above embodiment of my invention as for example as indicated in Figure 5, instead of the bead member comprising a pair of sections 10 and 11 it may comprise three, namely a central section 26 of double-taper form, and two outer sections 27 and 28 each of single-taper form: section 26 may slide and sections 27 and 28 be carried by the side chests. Again, instead of using an inflatable chamber I may use mechanical means such as a screw adapted to bear against a non-inflatable pad inside the section of the tire.

Having described my invention, what I claim is:

1. A tire repairing mold having a channel lying in a part of a circle and open toward the center of said circle and closing members in said channel and having their inner faces concentric with said channel to form a closed channel of circular curvature and having contacting faces inclined to the sides of said channel in a circumferential direction and slidable relatively to each other in a circumferential direction to wedge said members in said channel.

2. A tire repairing mold having a channel lying in a part of a circle and having the walls of said channel movable relatively toward or from each other to vary the width of said channel, said channel opening radially inwardly, and closing members in said channel having their inner faces concentric with said channel to form a closed channel of circular curvature and having contacting faces inclined to the sides of said channel in circumferential direction to wedge said members in said channel by moving one member relative to the other in a circumferential direction.

3. A tire repairing mold having a channel opening radially inwardly and lying in a part of a circle, a pair of closing members in said channel having their opposed faces inclined to the sides of said channel in a circumferential direction and a third closing member of wedge-shape between and complementary to the inclined faces of said pair of closing members all of said closing members having their inner faces concentric to the curvature of said channel to form a closed channel of circular curvature, said inner wedge-shaped member being movable circumferentially relative to said pair of side closing members.

4. A tire repair mold having a cavity to receive a segment of a tire and conforming with the walls and tread of said tire, said cavity being of variable width and a closure for said cavity at the bead of said tire, said closure comprising two side pieces having reversely inclined opposed faces to form a wedge shaped opening and a wedge shaped piece between said side pieces and movable circumferentially of said side pieces.

5. Tire repairing apparatus comprising a mold section forming the base and one side wall of the tire receptacle, a second mold section forming the remaining side wall of said receptacle, means for adjusting the spacing of said side walls and a closing member forming a top wall of said receptacle and having bead retaining flanges, the said closure member comprising at least two circumferentially tapered portions relatively movable circumferentially to vary the width of said closure member and the spacing of the bead retaining flanges.

6. The apparatus of claim 5 in which the closure member comprises two side portions the opposed edges of which are inclined in opposite directions and a central portion of double tapered form complementary to said opposed edges, said central portion being movable circumferentially relative to the side portions to vary the width of said closure member.

7. A tire repairing mold of variable width and bead members closing one side of said mold, said bead members having contacting faces extending in a direction lengthwise of the mold and inclined in a lengthwise direction to the sides of said mold, said bead members being slidable relative to each other in a lengthwise direction.

8. A tire repairing mold having a cavity to receive a segment of a tire and conforming with the walls and tread of said tire, said cavity being of variable width, and bead members closing said mold, said bead members having contacting faces extending in a direction circumferentially of the mold and inclined in a circumferential direction to the sides of said mold, said bead members being slidable relative to each other in a circumferential direction.

THOMAS NORCROSS.